(12) United States Patent
Watanabe

(10) Patent No.: US 7,999,924 B2
(45) Date of Patent: Aug. 16, 2011

(54) RANGE BINOCULARS

(75) Inventor: Naomi Watanabe, Saitama (JP)

(73) Assignee: Kamakura Koko Co., Ltd., Saitama (JP)

( * ) Notice: Subject to any disclaimer, the term of this patent is extended or adjusted under 35 U.S.C. 154(b) by 238 days.

(21) Appl. No.: 12/425,022

(22) Filed: Apr. 16, 2009

(65) Prior Publication Data

US 2010/0265490 A1    Oct. 21, 2010

(51) Int. Cl.
*G01C 3/08* (2006.01)
(52) U.S. Cl. ...... 356/5.01; 356/3.01; 356/3.1; 356/4.01; 356/4.1; 356/5.1
(58) Field of Classification Search ........ 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,126,549 A | 6/1992 | Yamada | |
| 6,204,961 B1 | 3/2001 | Anderson et al. | |
| 6,292,314 B1 * | 9/2001 | Perger | 359/834 |
| 2003/0002149 A1 | 1/2003 | Watanabe | |
| 2005/0128576 A1 | 6/2005 | Perger et al. | |

FOREIGN PATENT DOCUMENTS

| | | | |
|---|---|---|---|
| DE | 3704848 | * | 3/1988 |
| DE | 3704848 A1 | | 3/1988 |

OTHER PUBLICATIONS

European Search Report (3 pages, Oct. 19, 2009).

* cited by examiner

*Primary Examiner* — Thomas Tarcza
*Assistant Examiner* — Luke Ratcliffe
(74) *Attorney, Agent, or Firm* — The Maxham Firm

(57) ABSTRACT

Range binoculars capable of measuring a distance between the observation place and an object, the binoculars being made small-sized with keeping the functions as binoculars. The range binoculars includes first and second optical systems, each with an eyepiece optical member, an objective lens optical member, and an erecting prism consisting of a first prism and a second prism, wherein the first optical system has a first optical axis parallel with a second optical axis of the second optical system; first and second beam splitters, each with a beam-splitting face, wherein the first beam splitter is disposed between the first prism and the second prism of the first optical system, and the second beam splitter is disposed between the first prism and the second prism of the second optical system; an emitter for emitting a laser beam toward an object via the first beam splitter; a photodetector for receiving the laser beam which was emitted by the emitter, reflected by the object, and comes to the photodetector via the second beam splitter; a calculator for determining a distance from an observation place to the object using a flight time of the laser beam taken from the emitter to the photodetector; a measurement result display for displaying the distance determined by the calculator; and a casing accommodating the first and second optical systems, the first and second beam splitters, the emitter, the photodetector, the calculator, and the measurement result display.

2 Claims, 4 Drawing Sheets

RANGE BINOCULARS

TECHNICAL FIELD

The present invention relates to range binoculars, more particularly a pair of binoculars capable of measuring a distance between the observation place and an object, the binoculars being made small-sized with keeping the functions as binoculars.

BACKGROUND ART

Perger US patent publication 2005/0128576A1 discloses "binoculars having an integrated laser rangefinder, comprising: first and second separate housing parts, each with an eyepiece and objective, which are connected to each other via a jointed bridge for eye width adjustment, and in which the first housing part contains a transmitter and a receiver of the laser rangefinder and also an optoelectronic display element in a fixed arrangement with respect to an optical observation axis."

However, binoculars equipped with a mechanism of measuring a distance from the observation place to an object become larger because devices in the binoculars are complicated, which is a primary factor in difficulty that the user experiences in operating the binoculars. Therefore demanded is a pair of range binoculars that can be reduced in size without detracting from their functions, such as focal adjustment and dioptric power adjustment.

[Patent Document 1] US2005/0128576 A1

DISCLOSURE OF THE INVENTION

Problems to be Solved by the Invention

The objective of the present invention is to provide a pair of binoculars capable of measuring a distance from the observation place to an object, the binoculars being made small-sized without detracting from the basic functions of binoculars, such as focal adjustment and dioptric power adjustment.

Means to Solve the Problems

In order to achieve the objective written above, the present invention provides the following means.

The first means is a pair of range binoculars comprising:

first and second optical systems, each with an eyepiece optical member, an objective lens optical member, and an erecting prism consisting of a first prism and a second prism, wherein the first optical system has a first optical axis parallel with a second optical axis of the second optical system;

first and second beam splitters, each with a beam-splitting face, wherein the first beam splitter is disposed between the first prism and the second prism of the first optical system, and the second beam splitter is disposed between the first prism and the second prism of the second optical system;

an emitter for emitting a laser beam toward an object via the first beam splitter;

a photodetector for receiving the laser beam which was emitted by the emitter, reflected by the object, and comes to the photodetector via the second beam splitter;

a calculator for determining a distance from an observation place to the object using a flight time of the laser beam taken from the emitter to the photodetector;

a measurement result display for displaying the distance determined by the calculator; and a casing accommodating the first and second optical systems, the first and second beam splitters, the emitter, the photodetector, the calculator, and the measurement result display.

The second means is the range binoculars according to the first means, wherein the beam-splitting face of the first beam splitter is capable of reflecting the laser beam emitted by the emitter, the beam-splitting face of the second beam splitter is capable of reflecting the laser beam reflected by the object, and the beam-splitting faces are disposed so that an image of the distance displayed by the measurement result display, as well as an image of the object, is capable of being formed.

ADVANTAGES OF THE INVENTION

The present invention provides a pair of binoculars capable of measuring a distance from an observation place to an object, the binoculars being made small-sized in their entirety without detracting from the functions as binoculars.

DETAILED DESCRIPTION OF THE PREFERRED EMBODIMENTS

Figure 1:
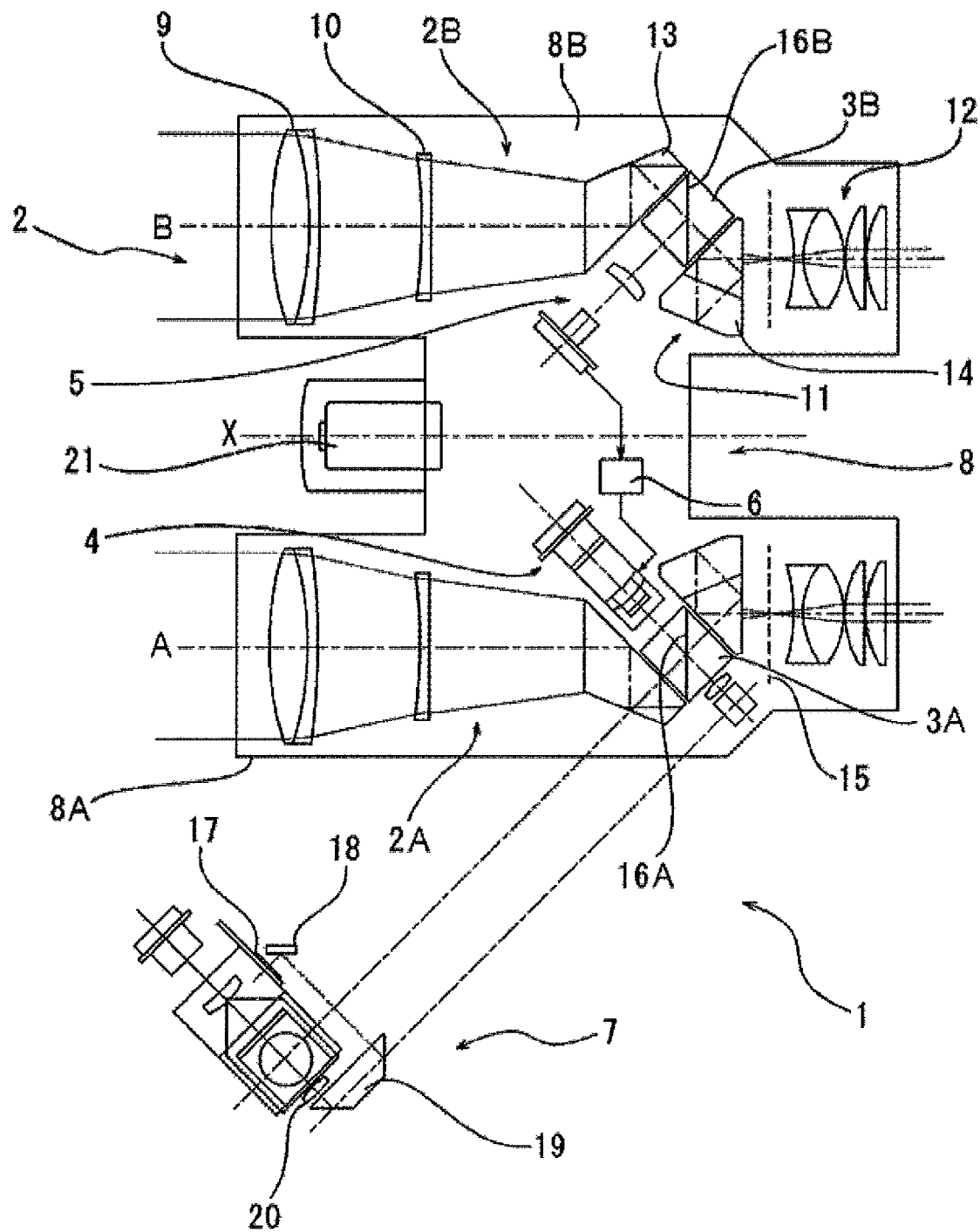
FIG. 1 is a schematic representation showing an embodiment of the range binoculars according to the present invention.

The range binoculars according to the present invention includes a pair of optical systems, beam splitters, an emitter, a photodetector, a calculator, a measurement result display, and a casing.

Each of the optical systems, or the first and second optical systems, has an eyepiece optical member, an objective lens optical member, and an erecting prism formed by a first prism and a second prism. Optical elements forming the first and second optical systems, which are first and second eyepiece optical members, first and second objective lens optical members, and first and second erecting prisms, each of which is composed of a first prism and a second prism, are arranged so that a first objective optical axis passing through the center of the first objective lens optical member is parallel with a second objective optical axis passing through the center of the second objective lens optical member, and a first ocular optical axis passing through the center of the first eyepiece optical member is parallel with a second ocular optical axis passing through the center of the second eyepiece optical member. The prism of each erecting prism disposed nearer to the objective lens optical member will be called the first prism and the prism disposed nearer to the eyepiece optical member will be called the second prism for the sake of explanation.

Eyepiece optical members and objective lens optical members used in such common binoculars as those without range-finding functions may be used for the eyepiece optical members and objective lens optical members included in the range binoculars according to the present invention.

There is no special limitation on the erecting prisms used in the range binoculars according to the present invention, as long as each of the erecting prisms is divided into the first prism and the second prism. Examples of the erecting prisms may include roof prisms such as Abbe prisms, Doubress's prisms, Schmidt-Pechan prisms and Koenig prisms, and Porro prisms.

The pair of optical systems may include diopter lenses respectively in addition to the eyepiece optical members and the objective lens optical members. When diopter lenses are included in the systems, the range binoculars of the present invention will also have a mechanism of adjusting the dioptric power, as well as a mechanism of moving the objective lens optical members to adjust the focus.

Each of the beam splitters, disposed between the first prism and the second prism, has a beam-splitting face. This arrangement makes a beam coming through each objective lens optical member pass through the first prism, the beam splitter, the second prism and the eyepiece optical member, before reaching the user's eye. There is no special limitation on the beam splitter, as long as it has a beam-splitting face. An example may be a beam splitter in the shape of a rectangular parallelepiped made by gluing a side face of a prism in the shape of a triangle pillar to a side face of another prism in the same shape, wherein either of the glued faces has been coated with a coating capable of reflecting a light beam of predetermined wavelengths.

The beam splitter has a beam-splitting face that reflects a laser beam emitted from the emitter, which will be explained hereinafter, and transmits light beams with a wavelength in the visible region. The position of each beam splitter is adjusted so that the laser beam reflected by the beam splitter passes along the objective optical axis of the corresponding optical system and the visible light beam transmitted by the splitter moves parallel to the objective optical axis thereof. Typically, the beam-splitting face of each beam splitter is positioned so that an incidence angle to the beam-splitting face is 45°. When an infrared laser is employed for the emitter, preferable embodiments of the beam splitter include such a splitter as to have a transmittance of 90% or more at a wavelength approximately from 400 to 600 nm and a transmittance of about 50% at a wavelength around 650 nm, and to reflect light beams with a wavelength around 900 nm, which falls under the infrared region.

The emitter irradiates the object with a laser beam via the first beam splitter of the first optical system.

The emitter emits a laser beam toward the first beam splitter of the first optical system. The laser beam is reflected by the beam-splitting face of the first beam splitter so that the reflected laser beam moves along the objective optical axis of the first objective lens optical member. The reflected laser beam further moves through the first or second prism, goes out of the binoculars through the first objective lens optical member, and travels to the object. Suitable laser beams such as infrared laser beams or visible laser beams may be used for the laser beam emitted by the emitter.

The laser beam emitted by the emitter and reflected by the object comes via the second beam splitter to the photodetector.

The photodetector is disposed in the second optical system, or the optical system that is different from the one in which the emitter is disposed. Part of the laser beam that is emitted to the object is reflected by the object, and comes into the second optical system. The laser beam that has come through the second objective lens optical member passes through the first prism or the second prism and moves to the second beam splitter. The laser beam is reflected by the beam-splitting face toward the photodetector and received by the photodetector.

It will be satisfactory if either one of the optical systems has the photodetector; the photodetector is disposed in the optical system that does not have the emitter.

The calculator calculates the distance from the observation place to the object using a flight time of the laser beam taken from the emission by the emitter through the reflection by the object to the receipt by the photodetector.

Any suitable means may be employed for the calculator, as long as it is capable of calculating the distance between the place where the observer uses the binoculars, which may sometimes be called "observation place" in this specification, and the object, using a flight time of the laser beam taken from the emission by the emitter through the reflection by the object to the receipt by the photodetector. Specific examples of the calculator may include an electronic calculator that calculates the distance between the observation place and the object using a time taken by the laser beam traveling from the emitter to the photodetector and the velocity of light.

The measurement result display shows the result calculated by the calculator.

The measurement result display may be anything as long as the observer understands the result of a calculation by the calculator. Displaying the calculation result in a field of view that the observer sees through the eyepiece optical members is preferable because it is easy for the observer to know the distance by seeing it.

The casing accommodates the pair of optical systems, the beam splitters, the emitter, the photodetector, the calculator and the measurement result display.

Various members and elements described hereinbefore are arranged in the casing, which prevents the range binoculars of the present invention from becoming bulky.

The range binoculars according to the present invention additionally have a mechanism of measuring a distance between an observation place and an object without marring the conventional mechanism of the binoculars for observing things. Also, the arrangement of the beam splitters between the first prisms and the second prisms and the placement of the distance-measuring members such as the emitter and the photodetector in the casing make it possible to reduce the dimensions of the entire binoculars.

A preferable embodiment of the beam splitter may be such that the beam-splitting face is capable of reflecting a laser beam emitted by the emitter and a laser beam reflected by an object, and such a beam splitter should be disposed so that an image of the measured distance shown by the measurement result display, as well as an image of the object, is capable of being formed. Employing this embodiment, the user is able to see an image of the distance from the observation place to an object, and an image of the object, via the eyepiece optical members, in a same field of view. The beam-splitting face of this embodiment is coated with a coating that reflects a laser beam. Specifically, the coating is provided so that the face to which a laser beam is sent reflects the laser beam, while the opposite face reflects an image beam of the measurement result outputted and displayed by the measurement result display in such a manner that the reflected image beam of the measurement result goes along the optical axis of light beams going to the eyepiece optical member.

How to use the range binoculars according to the present invention and the operations thereof will be explained hereinafter.

First, the user directs the optical axes of the pair of optical system to a target object. This operation enables the user to observe the object by a visible light reflected by the object and passing through the objective lens optical members, the first prisms, the beam splitters, the second prisms and the eyepiece optical members.

Then, the user focuses the binoculars on the object. When the range binocular is equipped with a lens and mechanism for adjusting a dioptric power, s/he carries out dioptric power adjustment after the focusing.

A laser beam is emitted by the emitter subsequently. Alternatively, the user may turn on the emitter before s/he directs the range binoculars to the target object.

Once a laser beam is emitted from the emitter, the laser beam goes to the first beam splitter. The beam splitter is typically disposed so that the incident laser beam and the beam-splitting face make an angle of 45°. Therefore the laser beam having entered the first beam splitter is reflected by the beam-splitting face thereof so that the reflected laser beam goes along the first objective optical axis of the first optical system.

The laser beam reflected by the beam-splitting face is sent to the first prism or the second prism, and further sent to the outside from the first objective lens optical member. The laser beam is inevitably sent to the target object which the user observes through the eyepiece optical members, because the laser beam travels along the first objective optical axis.

All or part of the entire laser beam that is sent to the object is reflected by the object, and part of the reflected laser beam enters the second optical system. The laser beam coming through the second object lens optical member of the second optical system passes through the first prism or the second prism and further enters the second beam splitter. The laser beam that entered the second beam splitter is reflected by the beam-splitting face thereof and sent to the photodetector.

The reception of the laser beam by the photodetector enables the calculator to determine the distance between the observation place and the object.

The result of the calculation by the calculator is outputted to the measurement result display, which shows the distance between the observation place and the object.

The user thus sees and knows the distance from him/her to the object shown by the measurement result display. When the respective beam-splitting faces of the first and second beam splitters are capable of reflecting a laser beam emitted by the emitter and a laser beam reflected by an object, and an image of the measured distance shown by the measurement result display is capable to be formed together with an image of the object, the user is able to see the image of the measurement result as well as the image of the object in a same field of view.

I will explain embodiments of the range binoculars according to the present invention, referring to the attached figures.

A pair of range binoculars 1 shown in FIG. 1, which is an example of the present invention, has a pair of optical systems 2, composed of a first optical system 2A and a second optical system 2B, a first beam splitter 3A and a second beam splitter 3B, an emitter 4, a photodetector 5, a calculator 6, a measurement result display 7, and a casing 8.

In FIG. 1, the second optical system 2B is located in the upper part of thereof, and the first optical system 2A in the lower part thereof. The second optical system 2B and the first optical system 2A are so disposed that they are symmetrical about the central axis X of the range binoculars 1 and a first optical axis A of the first optical system 2A is parallel with a second optical axis B of the second optical system 2B.

Each of the first and second optical systems 2 includes an objective lens 9, a diopter lens 10, a Schmidt-Pechan prism 11, and an eyepiece 12.

As shown in FIG. 1, the range binoculars 1 employ a Schmidt-Pechan prism 11 for the erecting prisms. The first prism of each erecting prism is a Pechan prism 13 and the second prism a Schmidt prism 14.

When a focal adjustment and a dioptric power adjustment is carried out with a focus-adjusting mechanism and a dioptric power-adjusting mechanism, neither of which is shown in the figures, light beams coming into the binoculars through the objective lenses 9 form an image on an image-forming plane 15 appearing between the Schmidt prism 14 and the eyepiece 12.

Each of the beam splitters 3A and 3B is disposed between the Pechan prism 13 and the Schmidt prism 14. The first beam splitter 3A and the second beam splitter 3B respectively have a first beam-splitting face 16A and a second beam-splitting face 16B, each of which is positioned so as to be perpendicular to the central axis X of the range binoculars 1 and to form an angle of 45.degree. with the path along which the laser beam enters each beam splitter 3A, 3B. The positioning of the beam-splitting face of each beam splitter shown in FIG. 1 makes the path of the laser beam entering the beam splitter lie on the objective optical axis of the corresponding optical system 2. Each of the beam splitters 3A and 3B is a prism in the shape of a rectangular parallelepiped made by gluing a side face of a prism in the shape of a triangle pillar to a side face of another prism in the same shape. The side face to be glued of either prism is coated with a coating before it is glued to the corresponding side face of the other prism, which provides the glued faces with special optical properties.

Figure 2:
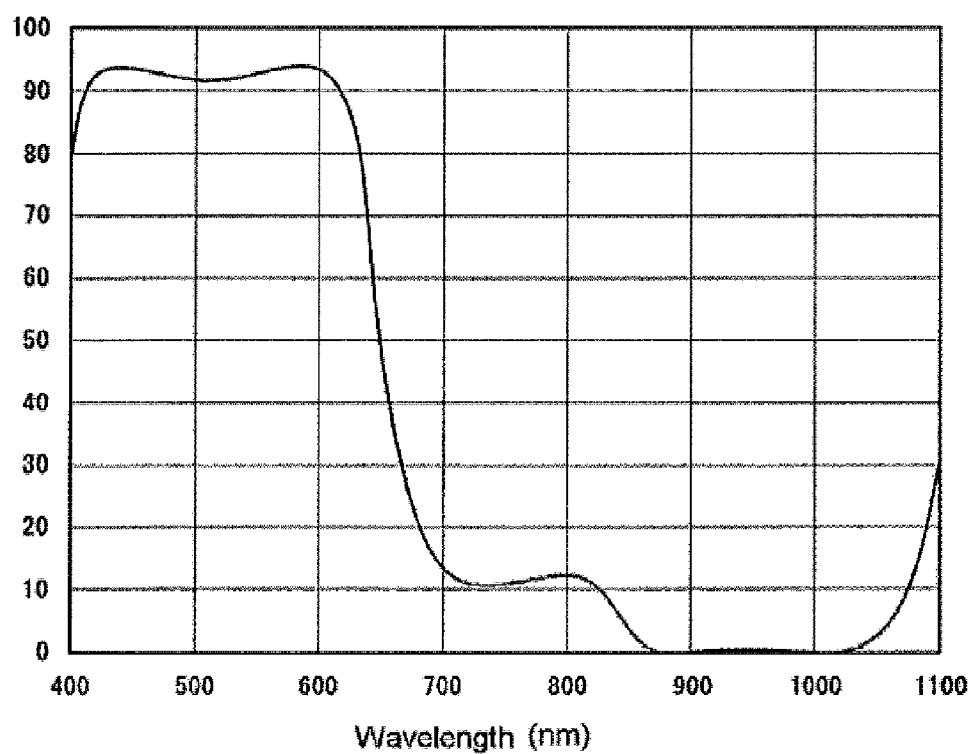
FIG. 2 is a graph showing an example of the optical properties of a beam-splitting face.

The optical properties of the beam-splitting face 16A, 16B of each beam splitter 3A, 3B are shown in FIG. 2. The beam-splitting face 16A, 16B has a transmittance of 90% or more at a wavelength from around 400 nm to 600 nm and a transmittance of approximately 50% at a wavelength around 650 nm, and is capable of reflecting a light beam with a wavelength around 900 nm. In summary, the beam-splitting face 16A, 16B transmits visible light while it reflects light beams in the infrared region, such as infrared laser beams.

The emitter 4 is a device including a light-emitting element, not shown in the figures, and is capable of emitting an infrared laser beam toward the first beam splitter 3A.

The photodetector 5 is a device including a photo-detecting element, not shown in the figures, capable of sensing a laser beam which is sent to the photodetector through the reflection by the second beam-splitting face 16B of the second beam splitter 3B that the laser beam enters after passing through the Pechan prism 13.

The calculator 6 is an electric calculator which calculates the distance between the observation place and the object based on the time period from the emission of a laser beam by the emitter 4 to the reception thereof by the photodiode 5 upon the sensing of the laser beam by the photodetector 5.

FIG. 1 includes an elevation below the casing 8, which shows the measurement result display 7 viewed along a horizontal line. The measurement result display 7 includes a display element 17, a mirror 18, a relay prism 19 and an image-forming lens 20. The relay prism 19 shown in the figure is a trapezoidal prism, which may alternatively be a rectangular prism. Upon the receipt of a calculated value outputted from the calculator 76, a controlling member such as an integrated circuit, which is not shown in the figures, displays the measurement result on the display element 17. An image of the measurement result shown on the display element 17 is projected onto the image-forming plane 15 via the mirror 18, the relay prism 19, the image-forming lens 20, the first beam splitter 3A and the Schmidt prism 14. The wavelength of a light beam containing image information describing the measurement result shown by the display element 17 of the measurement result display 7 may be decided appropriately, as long as the light beam is reflected by the first beam-splitting face 16A, with the reflected light beam having such a quantity of light as to be capable of forming an image on the image-forming plane 15, and the reflected light beam does not hurt the eyes of the observer through the eyepieces.

The members described hereinbefore are accommodated in an upper casing 8B, a cylindrical body occupying an upper part of the casing 8, and a lower casing 8A, a cylindrical body occupying a lower part thereof.

The emitter 4, the photodetector 5, the calculator 6 and the display element 17 shown in FIG. 1 are connected to a power source 21 depicted as a battery. Electric power supplied by the power source enables the range binoculars 1 to measure the distance between the observation place and an object.

Figure 3:
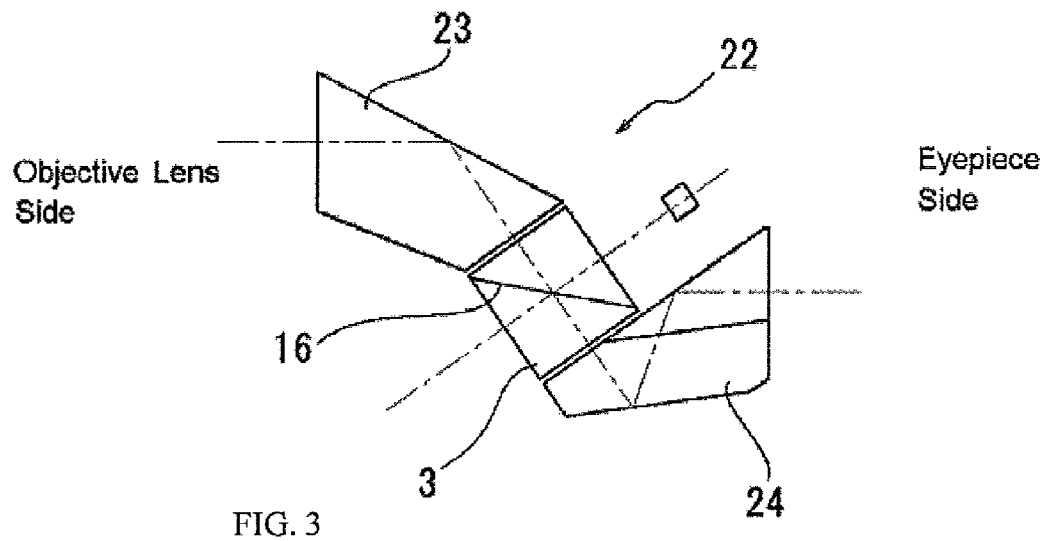
FIG. 3 is a schematic representation showing another example of the erecting prism and the beam splitter used in the range binoculars according to the present invention.
Figure 4:
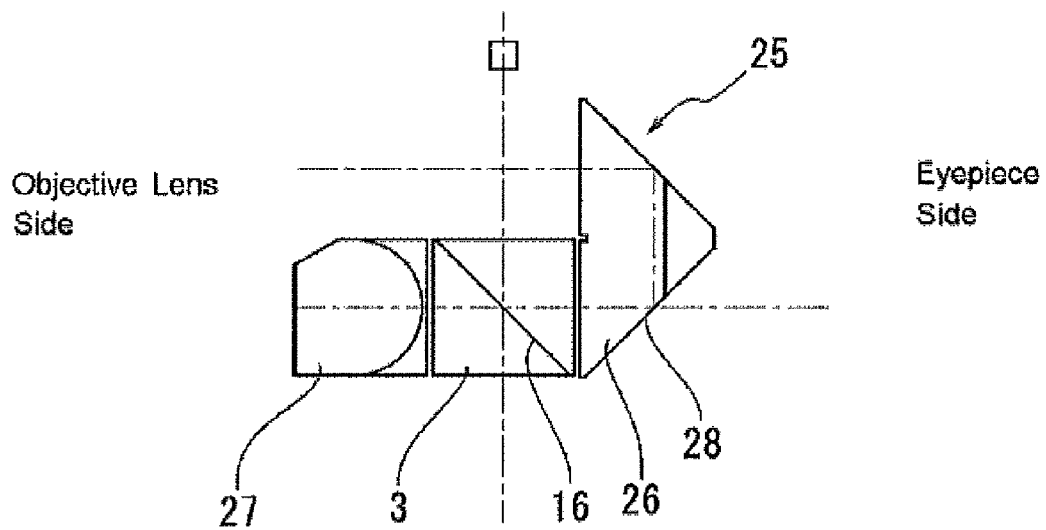
FIG. 4 is a schematic representation showing still another example of the erecting prism and the beam splitter used in the range binoculars according to the present invention.

As described above, the example shown in FIG. 1 employs a Schmidt-Pechan prism 11 for each of the erecting prisms. Other embodiments of the erecting prisms and the beam splitters are shown in FIGS. 3 and 4. The beam splitters shown in FIG. 1 and the beam splitters shown in FIGS. 3 and 4 have common members, which are referred to by the same reference numerals respectively. In the embodiments shown in FIGS. 3 and 4, the objective lens, which is not shown, is disposed on the left side of the erecting prism and beam splitter, and the eyepiece, which is not shown either, on the right side thereof. A rectangular member shown in the proximity of the beam splitter in FIGS. 3 and 4 is an emitter or a photodetector.

The erecting prism shown in FIG. 3 is an Abbe prism 22 consisting of a first prism 23 and a second prism 24. The beam splitter 3A, 3B is disposed between the first prism 23 and the second prism 24.

The erecting prism shown in FIG. 4 is a Porro prism 25, consisting of a first prism 27 and a second prism 26. In the same way as with the Abbe prism 22, the beam splitter 3A, 3B is disposed between the first prism 27 and the second prism 26. A lower slanting face 28 of the second prism 26 is coated with such a coating as the one applied to the beam-splitting face 16A, 16B, so as not to transmit a laser beam toward the eyepiece but to reflect it.

The erecting prisms used in the range binoculars of the present invention are not limited to those shown in FIGS. 1, 3 and 4. Manufacturers may select appropriate erecting prisms that contribute to a reduction in the size of the binoculars, depending on factors such as the arrangement of the first and second prisms and the dimensions of each prism.

The method of using the range binoculars 1 shown in FIG. 1 and the operation thereof will be described in the following.

First, the operator applies the eyepieces 12 to his/her eyes to look at an object through them, which directs the objective optical axes A and B of a pair of the optical system 2 to the object. When the objective optical axes A and B are directed to the object, the operator is able to observe it by light beams passing through the objective lenses 9, the diopter lenses 10, the Pechan prisms 13, the beam splitters 3A, 3B, the Schmidt prisms 14 and the eyepieces 12 in this order.

Then, the range binoculars are focused on the object. Also, the operator may adjust dioptric power by translating the diopter lenses 10 along the objective optical axes A and B using a dioptric power-adjusting mechanism, not shown in the figures.

The emitter 4 is allowed to emit a laser beam. A laser beam may have been emitted by the emitter 4 before the axes A and B were turned to the object.

Once a laser beam is emitted by the emitter 4, the laser beam enters the first beam splitter 3A. The laser beam is reflected by the first beam-splitting face 16A, which sets the path of the outgoing laser beam to the objective optical axis A of the first optical system 2A, because the first beam splitter 3A is disposed so that the incident laser beam and the first beam-splitting face 16A make an angle of 45° as shown in FIG. 1.

The laser beam reflected by the first beam-splitting face 16A enters the Pechan prism 13 and goes through the diopter lens 10 and the objective lens 9 to the outside. The path of the outgoing laser beam lies on the objective optical axis A of the first optical system 2A as explained above, which makes the laser beam travel to the object that the operator is observing through the eyepieces 12.

All or part of the laser beam sent to the object is reflected by the object, and part of the reflected laser beam returns to the second optical system 2B. The laser beam coming into the system through the objective lens 9 of the second optical system 2B comes through the diopter lens 10 to the Pechan prism 13, and further to the second beam splitter 3B. The laser beam having entered the second beam splitter 3B is reflected by the second beam-splitting face 16B thereof and sent to the photodetector 5.

Upon receiving the laser beam, the photodetector 5 outputs the receipt to the calculator 6. This output enables the calculator 6 to determine the distance between the observation place and the object.

The calculator 6 outputs the calculated result to the measurement result display 7 and the result is shown on the display element 17. A measurement result image beam containing image information describing the measurement result is reflected by the mirror 18 and sent to the relay prism 19 where the path of the laser beam is changed. The measurement result image beam, out of the relay prism, passes through the image-forming lens 20 and moves to the first beam splitter. The image beam is reflected by the first beam-splitting face 16A so as to travel parallel with the objective optical axis A, which lies aslant in the first beam splitter 3A at an angle of 45° to the first objective optical axis of light beams incident on the first objective lens. The image beam is projected onto the image-forming plane 15 through the Schmidt prism 14.

Thus the operator is able to see and know the distance between the observation place and the object, shown by the measurement result display 7.

Figure 5:
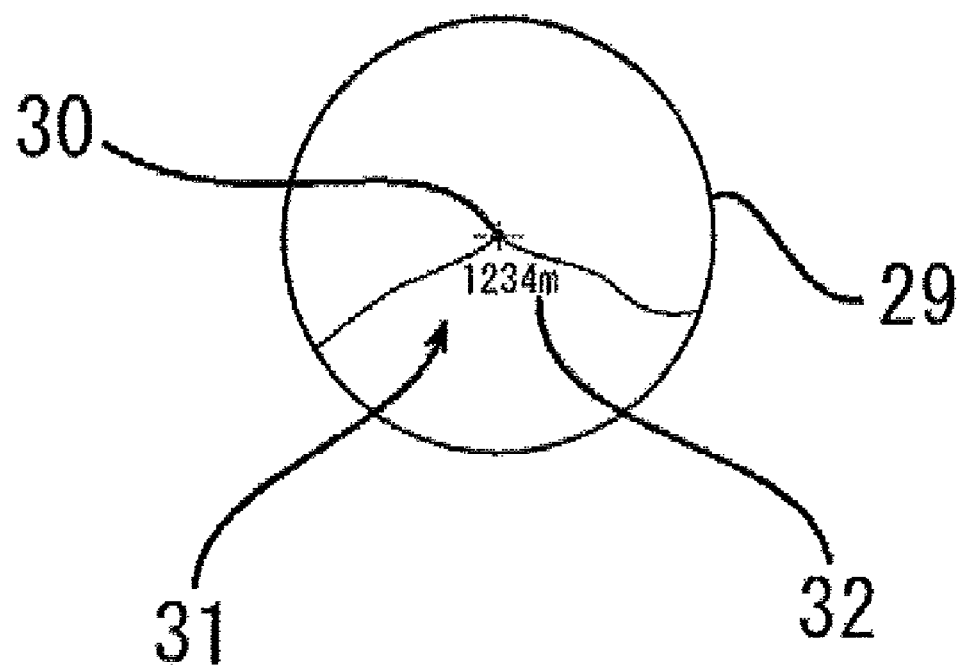
FIG. 5 is an illustration showing a field of view provided by an example of the range binoculars according to the present invention.

Referring to FIG. 5, I will explain a field of view 29 which the operator will see through the eyepieces when s/he measures a distance between the observation place and an object using the range binoculars 1. At the center of a field of view 29 is marked a laser target 30 to which the laser beam is sent. When the laser target 30 is set to a desired position of an object, a measurement result 32 is shown in the proximity of the laser target 30. The measurement result 32 is an image of the measured distance shown by the measurement result display 7.

The range binoculars according to the present invention are not limited to the embodiments described above but may be composed of other appropriate members, as long as the objective of the present invention is achieved.

EXPLANATION OF REFERENCE NUMERALS 1 range binoculars
2 a pair of optical systems
2A first optical system
2B second optical system
3A first beam splitter
3B second beam splitter 4 emitter
5 photodetector
6 calculator
7 measurement result display
8 casing
8A lower casing
8B upper casing
9 objective lens
10 diopter lens
11 Schmidt-Pechan prism
12 eyepiece
13 Pechan prism
14 Schmidt prism
15 image-forming plane
16A first beam-splitting face
16B second beam-splitting face
17 display element
18 mirror
19 relay prism
20 image-forming lens
21 power source
22 Abbe prism
23, 27 first prism
24, 26 second prism
25 Porro prism
28 slanting face
29 field of view
30 laser target
31 object
32 measurement result

I claim:

1. A pair of range binoculars comprising:

first and second optical systems, each with an eyepiece optical member, an objective lens optical member, and an erecting prism consisting of a first prism and a second prism, wherein the first optical system has a first optical axis parallel with a second optical axis of the second optical system;

first and second beam splitters, each of which is formed by gluing together two prisms in the shape of a triangular pillar on a side face of each prism, the first and second beam splitters each having a beam-splitting face, wherein the first beam splitter is disposed between the first prism and the second prism of the first optical system, and the second beam splitter is disposed between the first prism and the second prism of the second optical system;

an emitter for emitting a laser beam toward an object via the first beam splitter;

a photodetector for receiving the laser beam which was emitted by the emitter, reflected by the object, and comes to the photodetector via the second beam splitter;

a calculator for determining a distance from an observation place to the object using a flight time of the laser beam taken from the emitter to the photodetector;

a measurement result display for displaying the distance determined by the calculator; and a casing accommodating the first and second optical systems, the first and second beam splitters, the emitter, the photodetector, the calculator, and the measurement result display.

2. The range binoculars according to claim 1, wherein the beam-splitting face of the first beam splitter is capable of reflecting the laser beam emitted by the emitter, the beam-splitting face of the second beam splitter is capable of reflecting the laser beam reflected by the object, and the beam-splitting faces are disposed so that an image of the distance displayed by the measurement result display, as well as an image of the object, is capable of being formed.

* * * * *